United States Patent
Ghasripoor et al.

(10) Patent No.: US 6,969,231 B2
(45) Date of Patent: *Nov. 29, 2005

(54) ROTARY MACHINE SEALING ASSEMBLY

(75) Inventors: Farshad Ghasripoor, Scotia, NY (US); Norman Arnold Turnquist, Sloansville, NY (US); Bernard Arthur Courture, Schenectady, NY (US); Ronald Wayne Korzun, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 65 days.

This patent is subject to a terminal disclaimer.

(21) Appl. No.: 10/248,259

(22) Filed: Dec. 31, 2002

(65) Prior Publication Data

US 2004/0126225 A1 Jul. 1, 2004

(51) Int. Cl.⁷ .......................... F01D 11/12; F16J 15/447
(52) U.S. Cl. ................ 415/173.4; 415/173.6; 415/173.7; 415/174.4; 277/415
(58) Field of Search .............. 415/170.1, 173.1, 415/173.3, 173.4, 173.6, 173.7, 174.2, 174.4; 277/413, 415

(56) References Cited

U.S. PATENT DOCUMENTS

| 3,537,713 | A | * | 11/1970 | Matthews et al. ....... 415/174.4 |
| 3,879,831 | A | * | 4/1975 | Rigney et al. ........... 415/173.4 |
| 3,966,356 | A | | 6/1976 | Irwin |
| 4,080,204 | A | | 3/1978 | Panzera |
| 4,433,845 | A | | 2/1984 | Shiembob |
| 4,662,821 | A | | 5/1987 | Kervistin et al. |
| 5,188,507 | A | | 2/1993 | Sweeney |
| 5,196,471 | A | | 3/1993 | Rangaswamy et al. |
| 5,314,304 | A | * | 5/1994 | Wiebe ...................... 415/173.4 |
| 5,434,210 | A | | 7/1995 | Rangaswamy et al. |
| 5,456,576 | A | * | 10/1995 | Lyon ........................ 415/173.3 |
| 5,536,022 | A | * | 7/1996 | Sileo et al. .............. 415/173.4 |
| 5,599,026 | A | | 2/1997 | Sanders et al. |
| 5,603,510 | A | * | 2/1997 | Sanders .................... 415/173.3 |
| 5,704,614 | A | | 1/1998 | Sanders et al. |
| 5,735,667 | A | * | 4/1998 | Sanders et al. .......... 415/170.1 |
| 5,749,584 | A | | 5/1998 | Skinner et al. |
| 5,927,942 | A | | 7/1999 | Stahl et al. |
| 5,971,400 | A | | 10/1999 | Turnquist et al. |
| 6,012,723 | A | | 1/2000 | Beeck |

(Continued)

FOREIGN PATENT DOCUMENTS

JP       2298604 A       5/1989

OTHER PUBLICATIONS

Patent Application, Norman Turnquist et al., Filed Jun. 18, 2001, U.S. Appl. No. 09/681,851.
An Englist Abstract is attached to JP2–298604.

*Primary Examiner*—Edward K. Look
*Assistant Examiner*—Richard A Edgar
(74) *Attorney, Agent, or Firm*—Penny A. Clarke; Patrick K. Patnode

(57) ABSTRACT

A sealing assembly for disposition in a rotary machine is disposed between a rotary component and a stationary component of the rotary machine. The sealing assembly includes at least one sealing strip affixed by caulking to one of the rotary and stationary components. An abradable portion is disposed on another of the rotary and stationary components and is positioned radially opposite to the at least one sealing strip. The abradable portion includes a thermal spray coated material, and the thermal spray coated material includes Cobalt, Nickel, Chromium, Aluminum, Yttrium (CoNiCrAlY) and further includes a material selected from the group consisting of hexagonal boron nitride, a thermoset polymer, and combinations thereof.

13 Claims, 4 Drawing Sheets

U.S. PATENT DOCUMENTS

| | | |
|---|---|---|
| 6,027,121 A | 2/2000 | Cromer et al. |
| 6,045,134 A | 4/2000 | Turnquist et al. |
| 6,105,967 A | 8/2000 | Turnquist et al. |
| 6,131,910 A | 10/2000 | Bagepalli et al. |
| 6,220,814 B1 | 4/2001 | Brushwood et al. |
| 6,340,286 B1 | 1/2002 | Aksit et al. |
| 2002/0192074 A1 * | 12/2002 | Turnquist et al. ......... 415/73.3 |
| 2003/0107181 A1 * | 6/2003 | Wieghardt ................. 277/415 |

* cited by examiner

ROTARY MACHINE SEALING ASSEMBLY

BACKGROUND OF INVENTION

The present invention relates generally to sealing assemblies for rotary machines and, more particularly, to a sealing assembly for a steam or gas turbine.

Rotary machines include, without limitation, steam turbines, compressors and gas turbines. A steam turbine has a steam path that typically includes, in serial-flow relationship, a steam inlet, a turbine, and a steam outlet. A gas turbine has a gas path, which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, gas path leakage in the turbine or compressor area of a gas turbine, between the rotor of the turbine or compressor and the circumferentially surrounding turbine or compressor casing, will lower the efficiency of the gas turbine leading to increased fuel costs. Also, steam-path leakage in the turbine area of a steam turbine, between the rotor of the turbine and the circumferentially surrounding casing, will lower the efficiency of the steam turbine leading to increased fuel costs.

To reduce gas and steam-path leakage in gas and steam turbine engines, labyrinth sealing assemblies are used. In steam turbines a sealing assembly having caulked-in sealing strips, which are disposed between rotary and stationary components of the turbine engine, is often employed. Such a sealing assembly, however, requires a trade-off between turbine efficiency and sealing assembly integrity. For example, the effectiveness of the sealing assembly depends significantly on maintaining a desired clearance between the sealing strips and the rotary component positioned radially opposite thereto. Exceeding the desired clearance degrades the efficiency of the turbine engine. However, under certain circumstances, for example during transient and startup conditions, the rotary component may be displaced from its normal position, causing the rotary and stationary components to interfere. As a result, the sealing strips rub against the rotary component, potentially damaging the sealing strips. Thus, in order to maintain the sealing assembly integrity, a larger than desired sealing assembly clearance may be necessary, which in turn reduces the efficiency of the turbine engine. Present techniques used to compensate for greater clearances between rotary and stationary components include altering the configuration of the interfering surfaces with integral machined rails or teeth. However, such techniques are expensive to implement and may require replacement of the rotary components in the event of damage to the machined tooth under unpredictable transient behavior.

Accordingly, it would be desirable to develop a cost effective sealing assembly that permits tight clearances, without impairing the performance of the sealing strips because of any damage during transient rubs.

SUMMARY OF INVENTION

Briefly, in accordance with one embodiment of the present invention, a sealing assembly for disposition in a rotary machine is disclosed. The sealing assembly is disposed between a rotary component and a stationary component of the rotary machine. The sealing assembly includes at least one sealing strip affixed to one of the rotary and stationary components. An abradable portion is disposed on another of the rotary and stationary components and is positioned radially opposite to the sealing strip.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
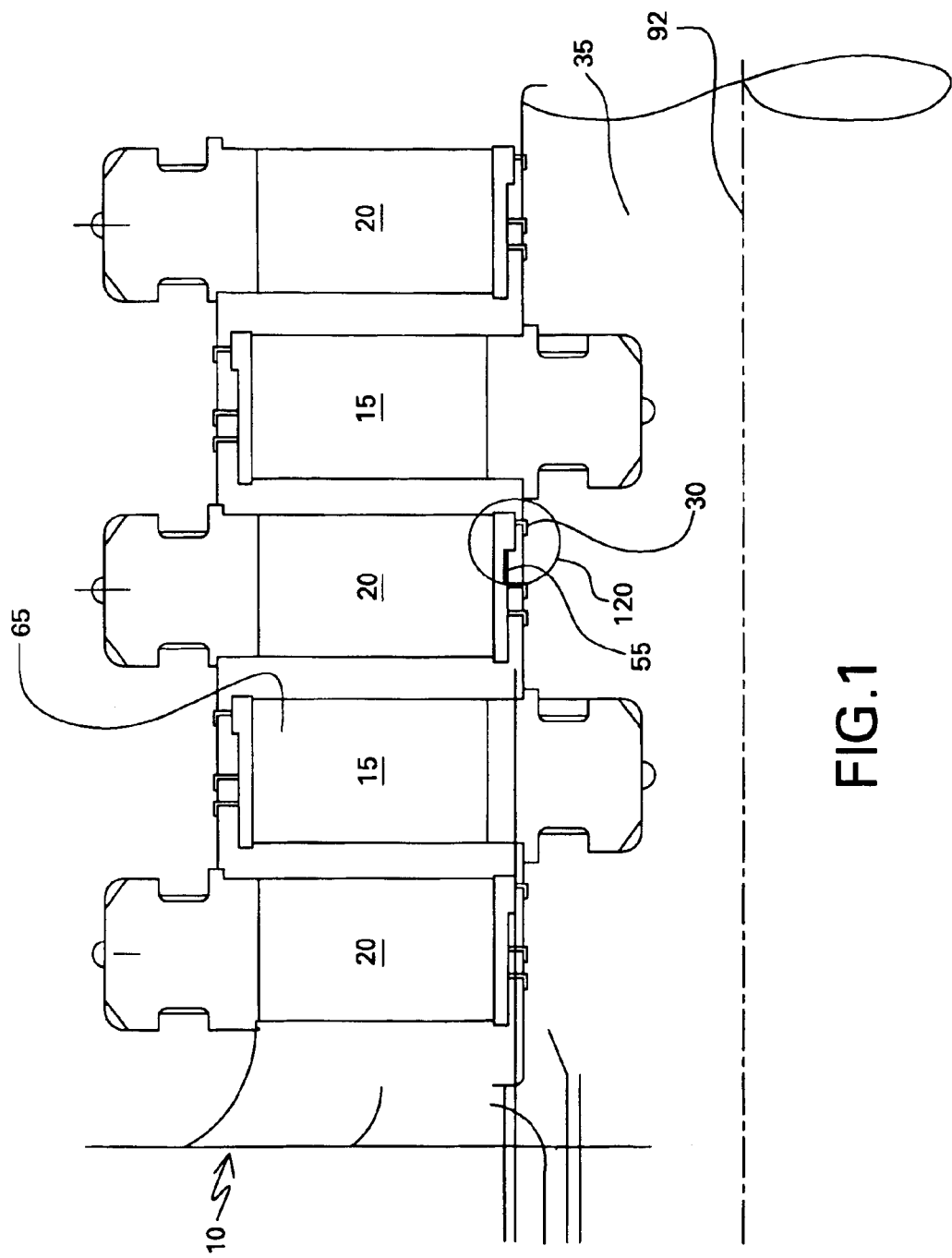
FIG. 1 is a cross-sectional, schematic view of an exemplary rotary machine, which includes a rotary component, a stationary component and a sealing strip.

As illustrated in FIG. 1, a typical rotary machine 10 such as a steam turbine (also indicated by reference numeral 10), typically includes at least one rotary component 15, such as a rotor 35 or rotating buckets 65, and a stationary component 20, such as a stationary steam nozzle (also indicated by reference numeral 20) surrounding the rotary component 15. The rotary component 15 and the stationary components 20 are disposed circumferentially around a common axis 92. For the steam turbine 10, steam passing through the stationary nozzles 20 is directed at a high velocity against the rotary component 15 causing it to rotate at a high speed.

A sealing assembly 120 is described first with reference to FIG. 1. As shown, the sealing assembly 120 is disposed between the rotary component 15 and the stationary component 20. Referring also to FIG. 1, the sealing assembly 120 includes at least one sealing strip 30, which is affixed to either the rotary component 15 or the stationary component 20. An abradable portion 55 is disposed on the other one of the rotary and stationary components 15, 20.

Figure 2:
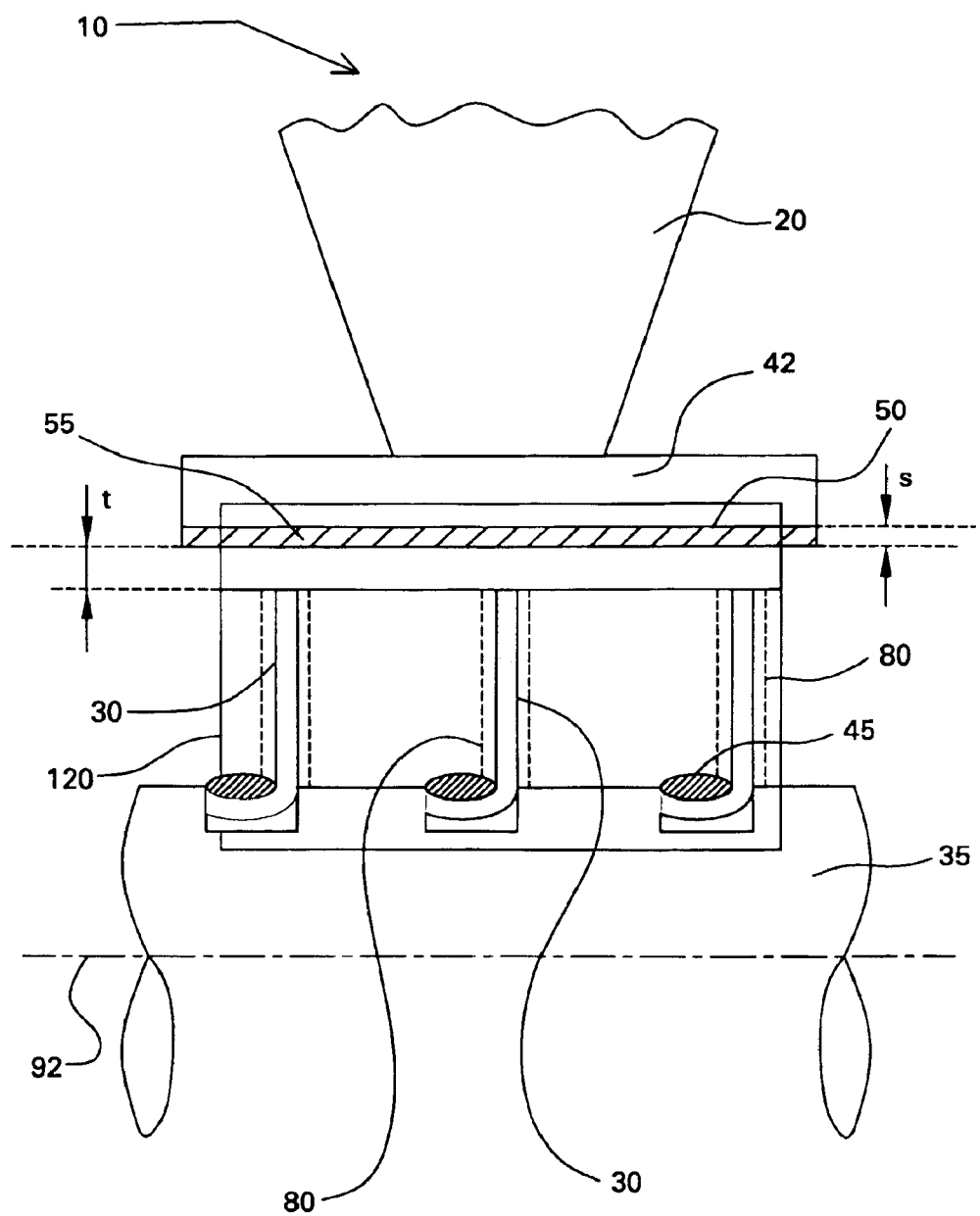
FIG. 2 is an enlarged, detailed view of portion X of FIG. 1 showing an exemplary sealing assembly embodiment that includes several sealing strips and an abradable portion.
Figure 3:
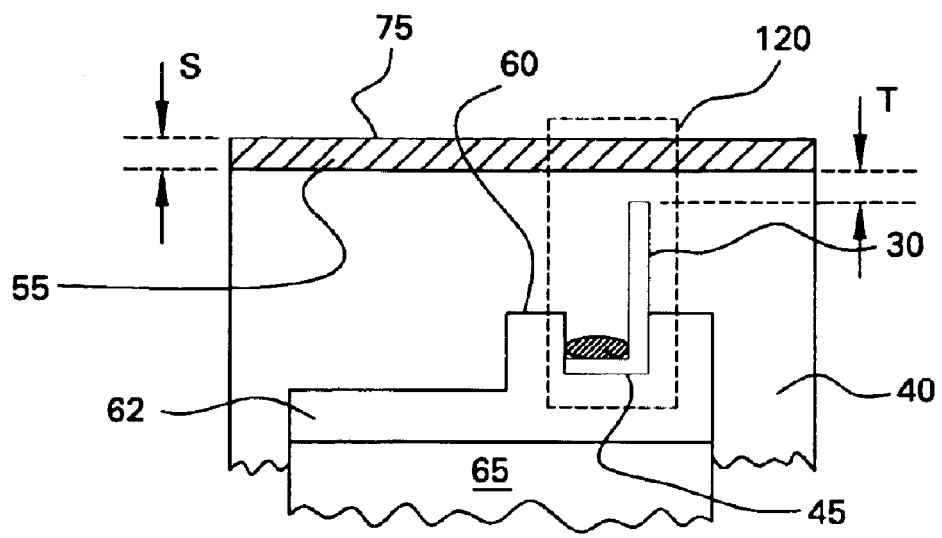
FIG. 3 illustrates another exemplary sealing assembly embodiment, which includes a sealing strip mounted in a bucket cover and an abradable portion on a stationary component.

FIGS. 1 and 2 illustrate embodiments of the sealing assembly 120, for which at least one sealing strip 30 is affixed to the rotary component 35, and the abradable portion 55 is disposed on the stationary component 20. For the particular embodiment shown in FIG. 2, the rotary component includes a rotor 35, and the stationary component includes a nozzle 20 having a nozzle cover 42. For the particular embodiment shown in FIG. 2, a series of sealing strips 30 is affixed to the rotor 35 by suitable attachment means 45, typically a caulking wire 45, for example. An abradable portion 55 is disposed on the outer surface 50 of the nozzle cover 42 and is positioned radially opposite to the sealing strip 30. For the particular embodiment shown in FIG. 3, the rotary component includes a bucket 65 having a tip 60 and the stationary component includes a casing 40. As used here, the bucket tip 60 is the tip of the cover 62 on the bucket 65, as shown in FIG. 3, for example. As shown, the sealing strip 30 is affixed to the bucket tip 60. The sealing strips 30 typically have a thickness desirably in the range between about 0.012 millimeters (0.005 inches) to about 2.54 millimeters (0.100 inches) and, more particularly, about 0.254 millimeters (0.010 inches) to about 0.762 millimeters (0.030 inches). Maintaining the thickness of the sealing strips 30 within the desired range beneficially provides integrity of the sealing strip 30 when the sealing strips 30 interfere with the abradable portion 55 causing localized plastic deformation of the abradable particles. Accordingly, a entrapment of wear debris between the sealing strip 30 and the abradable portion 55 releases abradable particles from the next layer of abradable coating to form a new abradable layer, minimizing incursion on the abradable portion 55 thereby.

Figure 4:
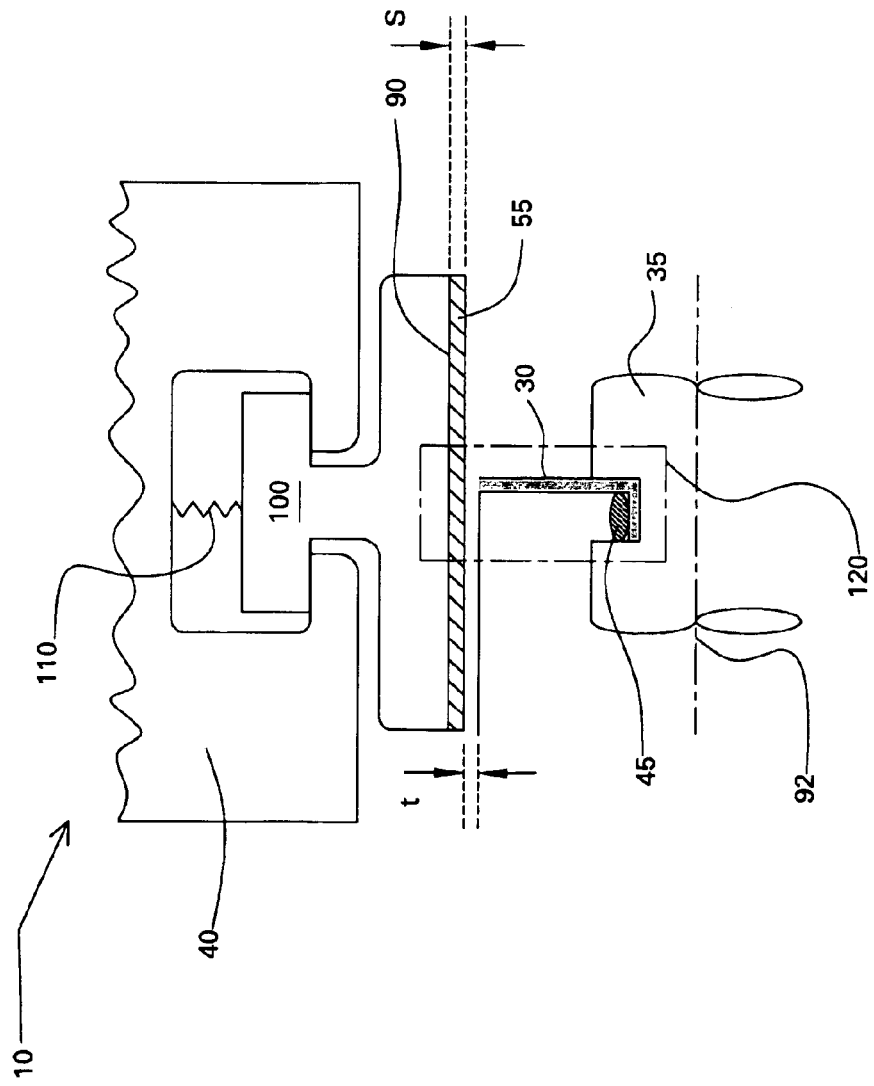
FIG. 4 illustrates an exemplary spring-backed sealing assembly embodiment.

Referring to FIG. 2 through FIG. 4, the abradable portion 55 typically projects from the surface 50, 75, 90, on which it is disposed, through a distance "s". A cold-build radial clearance "t," between the sealing strip 30 and the surface 50, 75, 90 radially opposite to the sealing strip 30, may be determined depending on factors such as the maximum expected radial incursion of the turbine bucket 65 or the turbine rotor 35 into the abradable portion 55. Consequently, the cold-build radial clearance "t" depends on the predetermined deflection of rotary machine 10 and the radial deflection of the turbine bucket 65 or the turbine rotor 35 under transient or steady state operation of the rotary machine 10. The abradable portion 55 typically protects the sealing strip 30 against possible wear when the sealing strip 30 interferes with the surface 50, 75, 90 during typical operating circumstances, for example during startup and transient conditions of the rotary machine 10. Namely, the abradable portion 55 comprises a sacrificial coating, which is indented by the sealing strip 30 without causing any damage to the sealing strip 30 while rubbing the sealing strip 30 against the surface 50, 75, 90 having abradable portion 55 disposed thereon. Consequently, the cold-build clearance "t" between the sealing strip 30 and the surface 50, 75, 90 radially opposite to the sealing strip 30 can be maintained at a "close clearance" value. Maintaining the "close clearance" value beneficially reduces leakage through a flow space between the sealing strip 30 and the surface 50, 75, 90, due to an increased resistance offered to the fluid flowing therethrough. Reducing leakage through the flow space improves overall efficiency and performance of the rotary machine 10.

Misalignment between the rotary component 15, such as the bucket 65 or rotor 35 and the stationary component such as casing 40 or nozzle 20 causes the sealing strips 30 and the abradable portion 55 to interfere. When the sealing strip 30 slides over the surface of the abradable portion 55, the combined effect of rotational or turning forces and the incursion forces dislodge the particles in the abradable coating, causing an incursion on the abradable portion 55. Accordingly, the abradable materials should desirably remain stable without rupture, delamination or causing damage to the rotary component during rubbing, under all possible cutting conditions. More particularly, the abradable coating disposed on the surface 50, 75, 90 should desirably have sufficient porosity so as to prevent damage of the sealing strip 30 thereby. For example the abradable coating should desirably have a porosity in a range of about fifteen to about sixty volume percent and, more particularly, in a range of about twenty-five to about fifty volume percent. Moreover, the abradable coating disposed on the surfaces 50, 75, 90 should have a thickness of between about 0.025 millimeters (0.001 inches) to about 0.381 millimeters 0.015 inches, and, more particularly, of between about 0.254 millimeters (0.010 inches) to about 1.524 millimeters (0.060 inches) and, still more particularly, of between about 0.381 millimeters (0.015 inches) to about 1.397 millimeters (0.055 inches).

Accordingly, an abradable material should desirably accommodate different wearing mechanisms under varying rub conditions which includes, without limitation, sealing strip material, operating temperature of the sealing assembly, tip velocity of the rotary component and incursion rate, for example. Accordingly, exemplary sealing strips 30 comprise materials, such as an austenitic stainless steel, a ferritic stainless steel, a Nickel based superalloy, a Cobalt based superalloy, a polymeric material and combinations thereof. In one embodiment shown in FIG. 2, the sealing strip 30 comprises an abrasive coating 80 to further enhance its wear resistance. Exemplary abrasive coatings 80 include alumina, chromium carbide and stellite.

Exemplary abradable materials for forming the abradable portion 55 include a thermal spray coated material, sintered metal fiber such as Feltmetal™ (offered for sale by Technectics Corp., Deland, Fla.) and a material having a honeycomb structure. Exemplary materials having a honeycomb structure include metallic or ceramic materials formed in a honeycomb structure. Exemplary thermal spray coated materials comprise a first component, for example Cobalt, Nickel, Chromium, Aluminum, Yttrium (hereinafter referred to as CoNiCrAlY) and a second component, for example hexagonal boron nitride, a thermoset polymer or a combination thereof. Beneficially, materials such as hexagonal boron nitride loosen the structure, thereby enhancing abradability of the abradable coating. As will be appreciated by those skilled in the art, other solid lubricants may also be used. Achieving desired porosity of the abradable coating is typically accomplished by controlling the thermal spray coating process itself or by addition of the thermoset polymer. Exemplary thermoset polymers include polyester and polyamide.

The sealing assembly 120 may further incorporate additional sealing mechanisms, to enhance the seal. For the embodiment shown in FIG. 4, the sealing assembly 120 further includes a spring-backed seal carrier segment 100 having at least one spring 110 disposed to maintain the seal carrier segment 100 disposed adjacent to the rotary component 35. The abradable portion 55 is disposed on the upper surface 90 of the seal carrier segment 100. Exemplary springs 110 include leaf springs and coil springs. Springs 110 apply a radial force, when assembled in the rotary machine 10, typically in the range of about 2 to about 5 times the weight of the seal carrier segment 100 that it is supporting. In operation, the springs 110 only need to provide enough force to "seat" seal carrier segment 100 radially toward stationary component 40 and keep seal carrier segment 100 disposed adjacent to the turbine rotor 35.

It will be apparent to those skilled in the art that, although the invention has been illustrated and described herein in accordance with the patent statutes, modification and changes may be made to the disclosed embodiments without departing from the true spirit and scope of the invention. It is, therefore, to be understood that the appended claims are intended to cover all such modifications and changes as fall within the true spirit and scope of the invention.

What is claimed is:

1. A sealing assembly for disposition in a rotary machine between a rotary component and a stationary component of the rotary machine, said sealing assembly comprising:

at least one sealing strip affixed by caulking to the rotary component;

an abradable portion disposed on the stationary component and positioned radially opposite to said at least one sealing strip, wherein said abradable portion comprises a thermal spray coated material, wherein said thermal spray coated material comprises Cobalt, Nickel, Chromium, Aluminum, Yttrium (CoNiCrAlY) and further comprises a material selected from the group consisting of hexagonal boron nitride, a thermoset polymer, and combinations thereof;

a seal carrier segment; and at least one spring disposed to maintain said seal carrier segment disposed adjacent to the rotary component, wherein said abradable portion is disposed on said seal carrier segment, and wherein the rotary component comprises a rotor, said at least one sealing strip being affixed to the rotor by caulking.

2. The sealing assembly of claim 1, wherein said abradable portion has a thickness in a range of about 0.254 millimeters (0.010 inches) to about 1.524 millimeters (0.060 inches).

3. The sealing assembly of claim 1, wherein said at least one sealing strip comprises a material selected from the group consisting of an austenitic stainless steel, a ferritic stainless steel, a Nickel based superalloy, a Cobalt based superalloy, a polymeric material, and combinations thereof.

4. The sealing assembly of claim 1, wherein said thermoset polymer is selected from the group consisting of polyester and polyamide.

5. The sealing assembly of claim 1, wherein said abradable portion has a porosity in a range of about fifteen to about sixty volume percent.

6. The sealing assembly of claim 5, wherein said abradable portion has a porosity in a range of about twenty five to about fifty volume percent.

7. The sealing assembly of claim 1, wherein each of said at least one sealing strips has an abrasive coating.

8. The sealing assembly of claim 7, wherein said abrasive coating comprises a material selected from the group consisting of alumina, chromium carbide and stellite and combinations thereof.

9. A rotary machine having a plurality of stages comprising:

a rotary component;

a stationary component surrounding said rotary component, said rotary and stationary components lying about a common axis; and a sealing assembly disposed between said rotary component and said stationary component, said sealing assembly comprising at least one sealing strip affixed by caulking to said rotary component and an abradable portion disposed on said stationary component, said abradable portion being positioned radially opposite to said at least one sealing strip, wherein said abradable portion comprises a thermal spray coated material, and wherein said thermal spray coated material comprises Cobalt, Nickel, Chromium, Aluminum, Yttrium (CoNiCrAlY) and further comprises a material selected from the group consisting of hexagonal boron nitride, a thermoset polymer, and combinations thereof, wherein said sealing assembly further comprises a seal carrier segment and at least one spring disposed to maintain said seal carrier segment disposed adjacent to said rotary component, said abradable portion being disposed on said seal carrier segment.

10. The rotary machine of claim 9, wherein said rotary component comprises a rotor, said at least one sealing strip being affixed to said rotor by caulking.

11. The rotary machine of claim 9, wherein said rotary component comprises a bucket having a bucket cover, said at least one sealing strip being affixed to said bucket cover by caulking.

12. The rotary machine of claim 9, wherein each of said at least one sealing strips has an abrasive coating.

13. The rotary machine of claim 9, wherein said rotary machine is a gas turbine.

* * * * *